United States Patent
Zesch et al.

(10) Patent No.: US 12,072,547 B2
(45) Date of Patent: Aug. 27, 2024

(54) CARRIER ARRANGEMENT FOR AN OPTICAL DEVICE

(71) Applicant: Optotune Switzerland AG, Dietikon (CH)

(72) Inventors: Wolfgang Zesch, Dietikon (CH); Dávid Almáši, Dietikon (CH); Manuel Aschwanden, Dietikon (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 0 days.

(21) Appl. No.: 18/295,272

(22) Filed: Apr. 4, 2023

(65) Prior Publication Data

US 2023/0324644 A1    Oct. 12, 2023

(30) Foreign Application Priority Data

Apr. 6, 2022    (EP) .................................. 22166922

(51) Int. Cl.
*G02B 7/02*    (2021.01)
*G02B 7/00*    (2021.01)

(52) U.S. Cl.
CPC ................................... *G02B 7/005* (2013.01)

(58) Field of Classification Search
CPC .......... G02B 7/02; G02B 7/026; G02B 7/003; G02B 7/00
See application file for complete search history.

(56) References Cited

U.S. PATENT DOCUMENTS

| | | |
|---|---|---|
| 6,266,300 B1 | 7/2001 | Tanaka |
| 8,752,969 B1 * | 6/2014 | Kane .................... G01C 11/025 |
| | | 359/872 |

FOREIGN PATENT DOCUMENTS

WO    2018138349    8/2018

* cited by examiner

*Primary Examiner* — Joseph P Martinez
(74) *Attorney, Agent, or Firm* — JMB Davis Ben-David

(57) ABSTRACT

Carrier arrangement (1) for an optical device (16) comprising a first carrier (2) and a second carrier (3), which are rotatable relative to each other about a first axis (8) that is defined by a first bearing means (7), wherein the first bearing means (7) is arranged between the first carrier (2) and the second carrier (3) and comprises at least one pin (9), preferably two pins, with a longitudinal axis (10), wherein the pin (9) is arranged such that its longitudinal axis (10) is essentially parallel to the first axis (8), wherein a first portion (17) of the pin (9) is attached to the first carrier (2) and a second portion (18) of the pin is moveably arranged in a notch (10) of the second carrier (3), or wherein the first portion (17) of the pin (8) is attached to the second carrier (3) and the second portion (18) of the pin (9) is moveably arranged in a notch (11) of the first carrier (2), the notch (11) comprising at least two support surfaces (30, 31) that are designed such that the second portion (18) of the pin (9) is supported in two circumferential sections by the notch (11), the carrier arrangement (1) further comprising a preload element (19, 22, 26) that is designed to exert a preload force (20, 23, 27) on the pin (9).

19 Claims, 4 Drawing Sheets

CARRIER ARRANGEMENT FOR AN OPTICAL DEVICE

CROSS-REFERENCE TO RELATED APPLICATIONS

Benefit is claimed to European Patent Application No. EP22166922.9, filed Apr. 6, 2022; the contents of which are incorporated by reference in their entirety

FIELD

The present invention relates to a carrier arrangement for an optical device.

BACKGROUND

In optical systems, it is often necessary to adjust the position or the orientation of an optical device, which may be an optical sensor, lens, mirror or a similar component. Moreover it may be desired, to decouple the optical device from undesired vibration or movement of the remaining structure of the optical system.

For this purpose, carrier arrangements of the type mentioned above are imaginable, which may comprise at least a first and a second carrier that are movable relative to each other. In this case, the optical device can be attached to one of the two carriers. When the carrier arrangement is moved, the carrier on which the optical device is arranged can be moved relative to the other carrier by means of an actuator. By such a relative movement, the optical device is adjusted in its position or orientation. Furthermore, the actuator can be designed to generate a dynamic counter-movement of the carrier carrying the optical device in order to counteract an undesired movement of the respective other carrier. This allows to use the optical device in applications that are usually affected by shocks or vibrations, which, however, can be decoupled from the optical device via the relative movement of the two carriers as described above.

In order to achieve a relative moveability between the first and the second carrier, bearing means are required. Such bearing means may be available commercially, however usually require a large installation space, especially if the carrier arrangement is subject to high acceleration forces. In addition, known bearing means are sensitive to dirt and are not suitable in the long term to allow an oscillating relative movement between the first carrier and the second carrier at low costs.

SUMMARY

It is therefore an object of the invention to provide a carrier arrangement for an optical device that allows to overcome the abovementioned drawbacks.

The object of the invention is solved by a carrier arrangement according to claim 1. Preferred embodiments are subject-matter of the dependent claims 2-18.

BRIEF DESCRIPTION OF THE FIGURES

In the following, examples of the present invention and its preferred embodiments are described with reference to the accompanying drawings.

DETAILED DESCRIPTION

Figure 1:
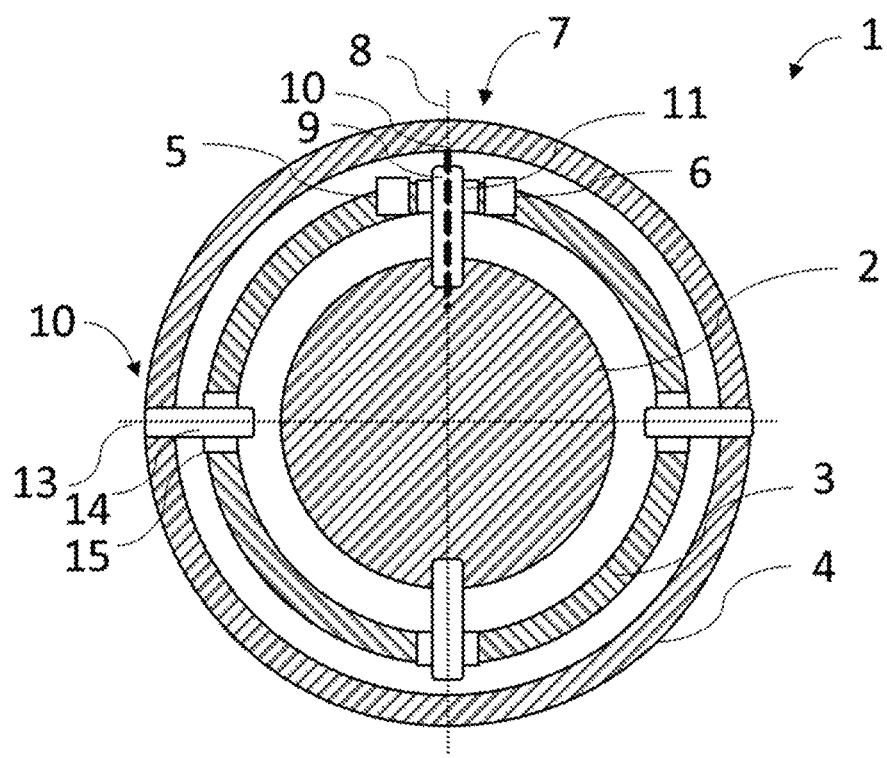
FIG. 1 shows a carrier arrangement according to the invention in top view.

According to the invention, the carrier arrangement for an optical device comprises a first carrier and a second carrier, which are rotatable relative to each other about a first axis. The first axis is defined by a first bearing means, which is arranged between the first carrier and the second carrier and comprises at least one pin, preferably two pins. The at least one pin comprises a longitudinal axis and is arranged such that its longitudinal axis is essentially parallel to the first axis.

A first portion of the pin is attached to the first carrier and a second portion of the pin is moveably arranged in a notch of the second carrier. Alternatively, the first portion of the pin is attached to the second carrier and the second portion of the pin is moveably arranged in a notch of the first carrier.

According to the invention, the notch comprises at least two support surfaces that are designed such that the second portion of the pin is supported in two circumferential sections of its second portion. The carrier arrangement also comprises a preload element that is designed to exert a preload force on the pin.

By means of the carrier arrangement described above, it is possible to overcome the above-mentioned disadvantages of known bearing means when used in a carrier arrangement.

In a simple embodiment, the first carrier and the second carrier can be formed as essentially flat parts and are arrangeable such that the carrier arrangement is in a planar state. In such a planar state, the first carrier and the second carrier preferably define a main extension plane of the carrier arrangement.

The first bearing means is used to enable a relative rotation of the two carriers about the first axis. Preferably, the first axis extends in the main extension plane such that a relative movement of the first carrier and the second carrier allows to pivot the first carrier or the second carrier out of the main extension plane.

The first bearing means comprises the pin, which, in a simple embodiment, may have a cylindrical geometry and is rotationally symmetrical with respect to its longitudinal axis. However, it is within the scope of the invention that the pin has a different geometry and is, for example, non-circular in shape or has different cross-sections along its longitudinal axis.

The first portion of the pin and the second portion of the pin are defined along the longitudinal axis of the pin and may be located immediately adjacent to each other or spaced apart along the longitudinal axis of the pin. It is within the scope of the invention that the first and second portions are structurally indistinguishable from each other or, however, are designed differently, for example with different cross-section or, for example, different extents along the longitudinal axis.

Regardless of how the pin is designed, it is attached to the first carrier or second carrier with its first portion. The second portion is moveably arranged in the notch of the respective other carrier. The invention is not limited to which of the two carriers is connected to the first portion of the pin and which has the notch for the second portion of the pin. Therefore, if the first carrier is attached to the first portion of the pin, the second carrier comprises a notch, that receives the second portion of the pin. If, however, the first carrier comprises a notch for the second portion of the pin, the second carrier is attached to the first portion of the pin.

The attachment of the first portion of the pin to the first carrier or the second carrier may be detachable or non-detachable. Preferably, the first carrier or the second carrier may comprise a hole whose shape corresponds to the first portion of the pin, such that the pin can simply be joined by means of a press fit. Alternatively, the first portion of the pin may be attached to the first or second carrier by adhesive means. Preferably, the attachment of the first portion to the first carrier or the second carrier is such that the pin cannot be displaced or rotated relative to the carrier, to which it is attached with its first portion.

The notch is designed to receive the second portion of the pin and to provide at least two support surfaces. The two support surfaces are each designed for a mechanical contact with the second portion of the pin. In a simple embodiment, the notch is designed as a recess or a groove on the surface of the first carrier or the second carrier, wherein the two support surfaces form the bottom of the notch. The notch may be open opposite the support surfaces. Preferably, the notch and its support surfaces extend along a common longitudinal extension direction. In such an embodiment, the pin is arranged in the notch such that its longitudinal axis corresponds to the longitudinal extension of the notch, wherein the second portion of the pin is in line-contact with each of the support surfaces.

The preload element exerts a preload force on the pin, which preferably is directed towards the support surfaces. In a simple embodiment, the preload element may be arranged opposed to the support surfaces of the notch. Preferably, the preload element comprises a spring element, that exerts the preload force on the pin such the second portion of the pin is pressed against the support surfaces of the notch and a permanent mechanical contact between the pin and both support surfaces is ensured.

One advantage of the invention is that the first carrier, the second carrier and the first bearing means can be manufactured with high tolerances, since the movable positioning of the pin within the notch allows a high degree of play during assembly. High assembly tolerances allow a cheap assembly that may easily be automated and allows a higher yield in terms of quality. At the same time, the pin does not move significantly in the assembled state due to the preload-force that is exerted by the preload-element. This allows a high functional safety.

Compared to conventional rolling bearings, the first bearing means is smaller and better suited for enabling oscillating motions. Furthermore, the first bearing means is less sensitive to dirt and cheap in its manufacture. In particular, compared to a rolling bearing in which ruby- or gem-elements are used as rolling elements, the first bearing means according to the invention allows the first and second carriers to be mounted easily and with large tolerances. The advantage of the invention with regard to polymer bearings is that play can be avoided and wear reduced. Unlike so-called pin-in-hole bearings, which do not allow to exactly define the position of the pin in the hole, the invention allows the pin to be positioned in a well-defined position within the notch.

In a preferred embodiment at least one optical device, in particular a mirror or a diffuser or a combination thereof, is attached to the first carrier. By tilting the first carrier about the first axis relative to at least the second carrier, the orientation of the optical device can be set and/or adjusted and/or undesired movements of the second carrier can be decoupled from the first carrier and thus also from the optical device.

In a preferred embodiment, the first carrier is surrounded by the second carrier, preferably at least in the planar state of the carrier arrangement. The first bearing means comprises two pins that each are arranged between the first and the second carrier on opposite sides of the first carrier. Each of the pins comprises the first portion that is attached to the first carrier or the second carrier, and wherein each of the pins comprises the second portion which is arranged in a notch of the respective other first carrier or the second carrier.

With regard to the embodiment described above, the first carrier may be designed as an essentially flat element that is connected to the first portions of the two pins on two of its opposite narrow sides. Alternatively, the first carrier may comprise two notches to receive the second portion of the two pins on two of its opposite narrow sides. The second carrier may be configured as a flat frame that encloses the first carrier. Preferably, such a frame-like second carrier comprises two opposite inner sides which are designed to be attached to the first portions of the two pins or have at least two notches to receive the second portions of the two pins. Preferably the two pins of the first bearing means are arranged between the first and second carrier such that their longitudinal axes are coaxial or at least parallel to the first axis of the carrier arrangement.

In a preferred embodiment, the carrier arrangement comprises a third carrier, which, at least partially surrounds the second carrier and the first carrier. The third carrier is rotatable relative to the first carrier and/or the second carrier about a second axis, which extends obliquely to the first axis and which is defined by a second bearing means that is arranged between the second carrier and the third carrier. The second bearing means comprises at least a second pin, wherein a first portion of the second pin is attached to the third carrier and a second portion of the second pin is moveably arranged in a second notch of the second carrier. Alternatively, a first portion of the second pin is attached to the second carrier and a second portion of the second pin is moveably arranged in a second notch of the third carrier.

By means of the preferred embodiment described above, it is possible in a simple manner to tilt at least the first carrier and the second carrier about a further axis, thus enabling a further movement by which an optical device that may be attached to the first carrier may be stabilized or decoupled from undesired movements of the third carrier.

Preferably, the third carrier is a flat part, that may be pivoted about the second axis relative to the first and second carrier. The carrier arrangement may be brought in the planar state, wherein the third carrier essentially extends along the main extension plane of the carrier arrangement. Preferably, the second axis is perpendicular to the first axis.

In accordance with the description of the first bearing means, the embodiment of the second bearing means is not limited to whether the second or third carrier is connected to the first portion of the second pin or includes a notch for the second portion of the second pin. Rather, the description of the design and advantages of the first bearing means can be transferred in full to the second bearing means. In particular, the second bearing means may comprise two second pins, that are arranged on opposite narrow sides of the second carrier and between the second carrier and the third carrier.

Unless explained otherwise, the term "pin", which is referred to in the following may be a first pin of the first bearing means or the second pin of the second bearing means.

In a preferred embodiment, at least one of the support surfaces of the notch is flat or rounded with a groove radius, which is larger than a pin radius in the second portion of the pin, preferably two times larger than the pin radius in the second portion of the pin.

Investigations have shown that the design of at least one, preferably both support surfaces may lead to advantages in terms of bearing forces that can be absorbed by the support surfaces, while at the same time ensuring low wear. Preferably, the two support surfaces are adjacent to a common edge formed in the bottom of the notch. In particular, the support surfaces enclose an opening angle between 60° to 90°.

According to a further embodiment, the notch, particularly the first and/or the second notch, comprises a round bottom, particularly at an apex of the bottom. Thus, in this embodiment, the support surfaces do not meet at a common edge at the apex of the bottom, but form a round bottom surface at the apex of the bottom of the respective notch.

The contact surfaces may be formed of PTFE, POM, bronze, sinter-bronze, steel or ruby. In this case, it is not necessary that the entire carrier on which the notch is formed is made of the above-mentioned materials. Rather, it is advantageous if only the support surfaces are made of such a material or are provided with this material in order to enable optimized contact properties.

In a preferred embodiment, the preload element is configured to exert a radial preload force on the pin, which is at least larger than two times, preferably larger than three to ten times, the weight of the carrier, which is attached to the first portion of the pin, preferably of the first or of the second pin.

In other words, the weight of the carrier, which is attached to the first portion of the pin corresponds to the weight of the first carrier if the first portion of the pin is attached to the first carrier. Alternatively, the weight of the carrier, which is attached to the first portion of the pin corresponds to the weight of the second carrier, if the first portion of the pin is attached to the second carrier. Alternatively, the weight of the carrier that is attached to the first portion of the pin corresponds to the weight of the third carrier, if the first portion of the pin is attached to the third carrier.

When the above-mentioned force is applied to the pin, secure contact pressure of the pin against the support surfaces of the notch can be ensured even in highly dynamic applications. This improves the stabilization effect of the carrier arrangement.

In a preferred embodiment, the preload element is designed to exert an axial preload force on the pin with respect to its longitudinal axis.

The axial preload force allows the pin to be positioned along a longitudinal extension of the notch. In addition, this axial preload force may be transmitted to the carrier that is connected to the first portion of the pin. If the axial preload force is exerted to the first pin of the first bearing means, a relative position of the first carrier and the second carrier can be set along the first axis of the carrier arrangement. If the axial preload force is exerted to the second pin of the second bearing means, a relative position of the second carrier and the third carrier can be set along the second axis of the carrier arrangement.

The preload element may be arranged such that the axial preload force is exerted coaxial to the longitudinal axis of the respective pin or, however, parallelly displaced to the longitudinal axis of the respective pin, wherein the displacement is not more than 25% of the radius of the pin.

In a preferred embodiment, the preload element comprises a spring element, that is inclined by 30° to 60° with respect to the first axis, or preferably the second axis, and which is designed to both exert a radial preload force and an axial preload force to the pin.

The advantage of the preferred embodiment described above is that a high degree of functional integration can be achieved in the design of the preload element. This is because only one component in the form of the spring element is required to exert both the axial and the radial preload force on the pin. In contrast to an embodiment in which two separate components are required to exert the two aforementioned forces on the pin, the assembly effort in the manufacture of the carrier arrangement can be reduced. Furthermore, less space is necessary for the assembly of the carrier arrangement with such a preload element.

In a preferred embodiment, the preload element comprises a pre-loaded elastic element, preferably a leaf spring, which is designed as an integral part of the first carrier, which comprises the notch.

By means of the further development described above, the assembly of the carrier arrangement can be further simplified, since the preload element may be designed as an integral component of the respective carrier. It is within the scope of the preferred embodiment, that each of the carriers or only a part of the carriers comprises an integrally formed preload-element.

The pre-loaded elastic element preferably comprises an actuation portion that is integrally attached to the respective carrier and may be elastically deflected with respect to the notch, in particular during the assembly of the carrier arrangement, when the pin is arranged in the notch. Due to its deflection, the preload-element is elastically deformed and exerts a restoring force that is directed to the notch of the carrier. The restoring force may act axially and/or radially with respect to the longitudinal axis of the respective pin that is arranged in the notch.

Additionally, or alternatively, the pin may be made of a magnetic material and the preload element comprises at least one magnet that exerts the radial and/or axial preload force on the pin by means of a field force. For this purpose, the magnet can be arranged on the carrier, which comprises the notch, or be arranged in the notch as an additional component. With this embodiment, mechanical contact between the pin and the preload element can be completely avoided, further reducing wear on the first or second bearing means.

In a preferred embodiment, the carrier arrangement comprises a stroke limiting element that delimits a displacement of the pin relative to the support surfaces of the notch.

The stroke limiting element may be arranged opposing the two support surfaces of the notch and preferably closes the open side of the notch, in particular such that a radial travel of the pin is delimited. The stoke limiting element, thus, acts as a mechanical abutment. In contrast to the preload element, the stroke limiting element is not used to exert a permanent preload force on the pin, but rather to prevent excessive movement of the pin.

In a simple embodiment, the stroke limiting element and the preload element are designed as structurally separated components, which allows a constructive separation of functions. This may be advantageous, since the preload element and the stroke limiting element may be designed independently of each other, so that the preload element alone serves to exert the preload force, but does not have to be designed to be rigid to act as a mechanical abutment.

Accordingly, the stroke limiting element alone may preferably be optimized with respect to a high stiffness.

In a preferred embodiment, the stroke limiting element is designed to support a radial force up to 20 times, preferably up to 100 times the weight of the carrier that is attached to the first portion of the pin.

In other words, the weight of the carrier that is attached to the first portion of the pin corresponds to the weight of the first carrier if the first portion of the pin is attached to the first carrier. Alternatively, the weight of the carrier that is attached to the first portion of the pin corresponds to the weight of the second carrier if the first portion of the pin is attached to the second carrier. Alternatively, the weight of the carrier that is attached to the first portion of the pin corresponds to the weight of the third carrier, if the first portion of the pin is attached to the third carrier.

According to this preferred embodiment, the stroke limiting element serves as a mechanical stop for the pin in case the preload element cannot absorb radially acting forces caused by an acceleration of the carrier that is attached to the first portion of the pin.

Preferably, the stroke limiting element is designed such that a radial pin travel is limited to 0.2 mm, preferably smaller than 0.1 mm relative at least one of the support surfaces of the notch. This allows to limit excessive radial movement of the pin within the notch. When the pin is accelerated against the preload force of the preload element, a limitation of the radial pin travel can ensure that the preload element is not damaged as a result of excessive deformation, especially if the preload element comprises a spring-element, whose deformation is only possible up to a certain degree.

Additionally, or alternatively, the stroke limiting element is designed to delimit an axial travel of the pin. In this further development, it is advantageous if not only the radial travel of the pin but also the axial travel of the pin is limited. Corresponding to the above explanations of the stroke limiting element, such a limitation of the axial pin travel serves to limit excessive deformation of the preload element if it exerts an axial preload force on the pin.

In a simple embodiment, the stroke limiting element may comprise an axial support surface facing the pin, in particular when the preload element exerts an axial force on the pin and can thus be supported via the axial support element. For this purpose, the axial support section may be formed as a wall, that delimits the longitudinal extension of the notch, such that the pin, which is axially preloaded by the preload element, is pressed against the axial support section. Additionally, or alternatively, the axial support surface may be formed of an additional abutment element, which is arranged in the notch.

If the first bearing means or the second bearing means comprises at least two pins, the axial preload element may be arranged to exert an axial preload force to one of the pins. The axial support surface may be arranged next to the respective other pin of the same bearing means. This is in particular imaginable, if the second carrier is surrounded by the third carrier, such that two pins of the second bearing means are arranged on opposite narrow sides of the second carrier. If the second portion of the second pin is arranged in a second notch of the second carrier, an axial preload force leads to a relative displacement of the second and third carrier along the second axis. However, by providing an axial support surface on the other second pin of the second bearing means, such a relative displacement can be limited in an easy manner.

In a preferred embodiment, the stroke limiting element and the preload element are designed as a monolithic single piece that is attached to one of the carriers. Such a monolithic single piece may comprise a metal or plastic part, which is arranged in the area of the notch, wherein the stroke limiting element is formed as a first component of the monolithic single piece having a higher stiffness than a second component of the monolithic piece serving as a preload element. When the pin is displaced in a radial or axial direction, the preload element absorbs the forces of the pin and is deformed until further deformation is prevented by the stroke limiting element. The stroke limiting element can serve as a stop for the preload element and/or as a stop for the pin.

It is within the scope of the preferred embodiment that multiple stroke limiting element are provided that each may act as a radial stroke limiting element or an axial stroke limiting element or a stroke limiting element that both limits radial and axial stroke of the pin.

In a preferred embodiment, the carrier arrangement comprises at least a first actuator, which is arranged such that a torque and/or a force is applicable to the first carrier and/or the second carrier, in order to cause a first relative tilt between the first carrier and the second carrier about the first axis. Preferably, the first actuator is a first magnetic actuator, comprising at least one magnet and at least one coil, wherein the magnet is attached to the first carrier and the coil is attached to the second carrier or vice versa.

By means of the first actuator it is easily possible to set a desired relative position between the first and the second carrier, for example if the carrier arrangement is moved in an undesired manner. It is also possible to set the first tilt-angle to a fixed value, in order to keep a relative tilt between the first and second carrier in a predefined relative position. The components of the first actuator can be arranged directly on the first and second carrier or may be held by additional fastening components of the carrier arrangement.

In a preferred embodiment, the carrier arrangement comprises at least a second actuator, which is arranged such that a tilt-torque and/or a tilt-force is applicable to the third carrier and/or the second carrier in order to cause a second relative tilt between the second carrier and the third carrier about the second axis. Preferably, the second actuator is a second magnetic actuator, comprising at least one magnet and at least one coil, wherein the magnet is attached to the second carrier and the coil is attached to the third carrier or vice versa. With regard to the second actuator, the same technical effects can be achieved as already explained with regard to the first actuator and its preferred embodiment as a magnetic actuator.

In a preferred embodiment, at least one tilt-sensor is arranged such that a first tilt-angle is determinable between the first carrier and the second carrier about the first axis and/or a second tilt-angle between the second carrier and the third carrier about the second axis. The invention is not limited to any particular design of such a tilt-sensor. Preferably, however, non-contact sensors may be used, which detect the first and/or second relative tilt based on a capacitive, inductive or optical mode of operation. Preferably, the tilt-sensor is integrated into the first or second actuator so that the first or second relative tilt may be determined from at least one relative position of the respective actuator components. Preferably, a control device is provided, which is connected to the first and/or second actuator by means of a signal-path and is designed to control the respective actuator. Most preferably, the control device is connected to the tilt-sensor and is designed to receive and evaluate the first and/or the second tilt-angle and preferably to output a control signal to the first or second actuator in order to adjust the first or second tilt angle as a function of a measured tilt.

For better understanding, the reference numerals as used in FIGS. 1 to 6 are listed below.

| | |
|---|---|
| 1 | Carrier arrangement |
| 2 | First carrier |
| 3 | Second carrier |
| 4 | Third carrier |
| 5 | Actuator |
| 6 | Sensor |
| 7 | First bearing means |
| 8 | First axis |
| 9 | First Pin |
| 10 | Longitudinal axis |
| 11 | First Notch |
| 12 | Second bearing means |
| 13 | Second axis |
| 14 | Second pin |
| 15 | Second notch |
| 16 | Optical device |
| 17 | First portion |
| 18 | Second portion |
| 19 | Radial preload element |
| 20 | Radial preload force |
| 21 | Stroke limiting element |
| 22 | Axial preload element |
| 23 | Axial preload force |
| 24 | Axial support element |
| 25 | Axial constraint force |
| 26 | Monolithic preload element |
| 27 | Preload force |
| 28 | Monolithic support element |
| 29 | Constraint force |
| 30 | First support surface |
| 31 | Second support surface |
| 32 | First support force |
| 33 | Second support force |
| 150 | Apex of bottom of notch |

FIG. 1 shows a carrier arrangement 1 that is used to moveably mount an optical device (not shown). The carrier arrangement 1 comprises a first carrier 2, a second carrier 3 and a third carrier 4, which are designed as essentially flat parts, that are tiltable with respect to each other, as is described in the following.

An optical device (not shown) may be attached to the first carrier 2. When the carrier arrangement 1 is moved, the first carrier 2, on which the optical device is arranged, can be moved relative to the second carrier 3 by means of an actuator 5. A sensor 6 is attached to the second carrier 3 and is configured to determine a relative position between the first carrier 2 and the second carrier 3.

Furthermore, the second carrier 3 can be moved relative to the third carrier 4 by another actuator (not shown), wherein the relative position between the second carrier 3 and the third carrier 4 can be determined by another sensor (not shown). By enabling such a relative movement between the first carrier 2, the second carrier 3 and the third carrier 4, the orientation of the optical device (not shown) can be set as required or for example be decoupled from shocks or vibrations, that may affect the carrier arrangement 1.

In order to enable a relative movement between the first carrier 2 and the second carrier 3, said carriers are connected by a first bearing means 7, which defines a first axis 8 of the carrier arrangement 1. The first carrier 2 and the second carrier 3 are pivotable about the first axis 8 relative to each other. The actuator 5 is arranged such that the relative position between the first carrier 2 and the second carrier 3 is a relative tilt about the first axis 8. In a manner not further described here, the actuator 5 is a magnetic actuator comprising a magnet and a coil, with the magnet being arranged on the first carrier 2 and the coil being arranged on the second carrier 3. The actuator 5 is configured to exert a tilt-torque about the first axis, thereby causing a relative tilt between the first carrier 2 and the second carrier 3. The sensor 6 is arranged in order to determine said relative tilt between the first carrier 2 and the second carrier 3 about the first axis 8. For a better overview, the actuator 5 and the sensor 6 are not shown in the FIGS. 2-5.

The first bearing means 5 comprises two pins 9 that are arranged on opposite sides of the first carrier and between the first carrier 2 and the second carrier 3. For a better overview, only one pin 9 is marked with reference numerals.

The pin 9 extends along a longitudinal axis 10 and is subdivided in a first portion and a second portion. The first portion of the pin 9 is attached to the first carrier 2 and the second portion is arranged in a notch 11 of the second carrier 3.

In addition to the first bearing means 7, the carrier arrangement 1 comprises a second bearing means 12, which defines a second axis 13, about which the second carrier 3 and the third carrier 4 can be pivoted relative to each other. In the shown embodiment according to FIG. 1, the first axis 8 and the second axis 13 are perpendicular to each other. In a manner not shown in FIG. 1, the carrier arrangement 1 comprises a second actuator and a second sensor. The second actuator is arranged to cause a torque along the second axis 13 and thus a relative tilt between the second carrier 3 and the third carrier 4. The second sensor is designed to detect this relative tilt about the second axis 13.

The second bearing means 12 comprises two pins 14 which are connected to the third carrier 4 on opposite sides of the second carrier 3. For better clarity, the second bearing means 12 is provided with reference signs in the area of one of the two second pins 14.

As is described in detail below, the second pin 14 also comprises a first portion, which is attached to the third carrier 4 and a second portion, which is arranged in a second notch 15 of the second carrier 3 (see FIG. 2). The arrangement of the second pin 14 with respect to the second carrier 3 and third carrier 4 is identical to the arrangement of the first pin 9 with respect to the first carrier 2 and second carrier 2.

Figure 2:
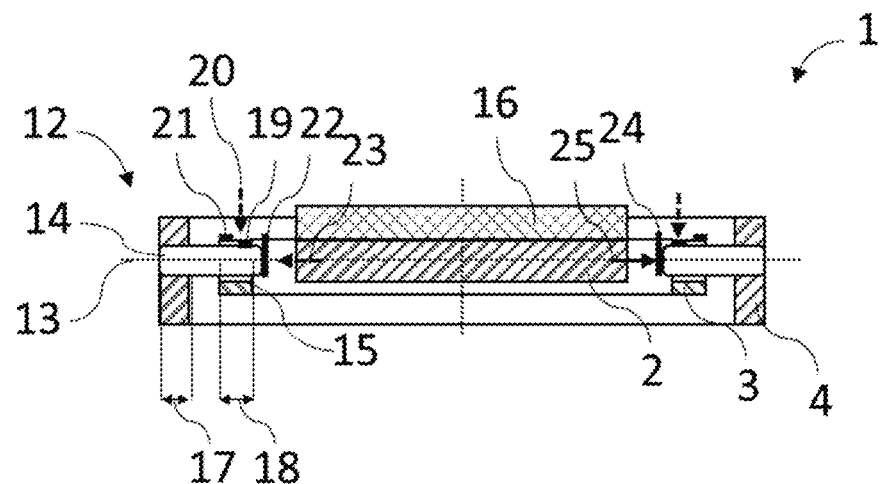
FIG. 2 shows the carrier arrangement in lateral section view with a first embodiment of bearing means.

For a better understanding of how the first bearing means 7 and second bearing means 12 are designed, reference is made to FIG. 2, which shows the second bearing means 7 in a cross-sectional side view. For better comprehensibility, only the second bearing means 12 will be referred to below, however all statements made can be transferred to the first bearing means 7.

As can be seen from FIG. 2, an optical device 15, which may, for example, be a mirror, is arranged on the first carrier 2. By tilting the first carrier 2 about the first axis 7 (see FIG. 1) and/or the second carrier about the second axis 13 (see FIG. 2), the orientation of the optical device 16 can be adjusted. As can also be seen from FIG. 2, the second pin 14 comprises the first portion 17 that is attached to the third carrier 4 and a second portion 18 that is arranged in the second notch 15 of the second carrier 3.

To retain the second pin 14 in the second notch 15, the carrier arrangement 1 includes a plurality of preload elements, one of which is a radial preload element 19 that is designed to exert a radial preload force 20 towards the second pin 14, pressing it against the bottom of the second notch 15. A radial stroke limiting element 21 is arranged next to the radial preload element 20 and delimits a radial travel of the pin, when the acceleration of the third carrier 4 exceeds the preload force 20.

Furthermore, the carrier arrangement 1 comprises an axial preload element 22 that is designed to exert an axial preload force 23 in direction of the second pin 14, essentially parallel to its longitudinal axis. This axial preload force 23 is directly transmitted to the third carrier 4, which would be displaced according to the direction of the axial preload force 23. However, by arranging an axial support element 24 on the opposite side of the second carrier 3, this axial preload force 23 can be supported by the other pin of the second bearing means 12, leading to a constraint force 25.

The arrangement of radial preload element 19 and the radial stroke limiting element 21 allows to set the radial position and delimit the radial movement of the second pin 14, while axial preload element 22 and axial support element 24 allow to define a relative position between the second carrier 3 and the third carrier 4 along the second axis 13.

Figure 3:
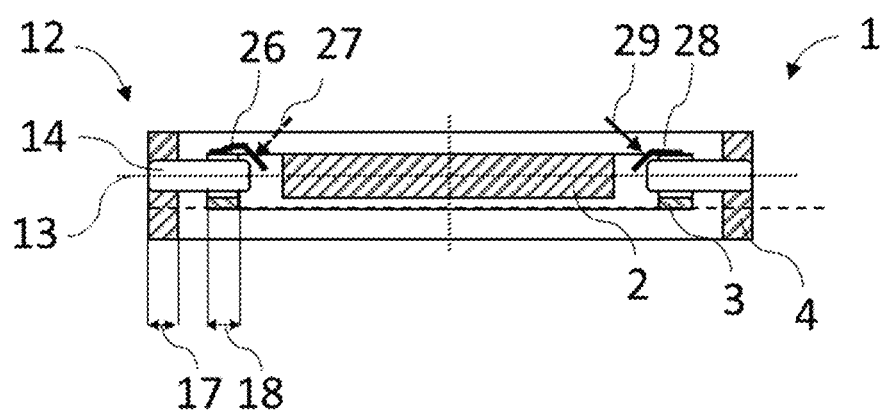
FIG. 3 shows a second embodiment of the carrier arrangement in lateral section view.

FIG. 3 shows an alternative embodiment of the carrier arrangement 1 in a sectional side-view. In accordance with the description of FIG. 2, the carrier arrangement 1 shown in FIG. 3 also comprises a second bearing means 12 with the second pin 14, whose first portion is attached to the third carrier 4 and whose second portion is arranged in the second notch 15 of the second carrier 3.

Unlike FIG. 2, however, the carrier arrangement 1 shown in FIG. 3 does not comprise a plurality of preload elements and stroke limiting elements. Instead, a monolithic element preload element 26 is provided, which exerts a single preload force 27 on the second pin 14. As can be seen from FIG. 3, the preload force is skewed relative to the second axis 13 in a way that it has both an axial and a radial component relative to the longitudinal axis of the second pin 14. As a result, it is possible to press the second pin 14 into the bottom of the second notch 15 in accordance with the description of FIG. 2 and at the same time to exert an axial force to the second pin 14.

The axial portion of the preload force 27 is transmitted via the third carrier to a monolithic support element 28, which generates a constraining force 29. Due to the geometry of the support element 28, this constraining force 29 is also inclined relative to the second axis 13.

Figure 4:
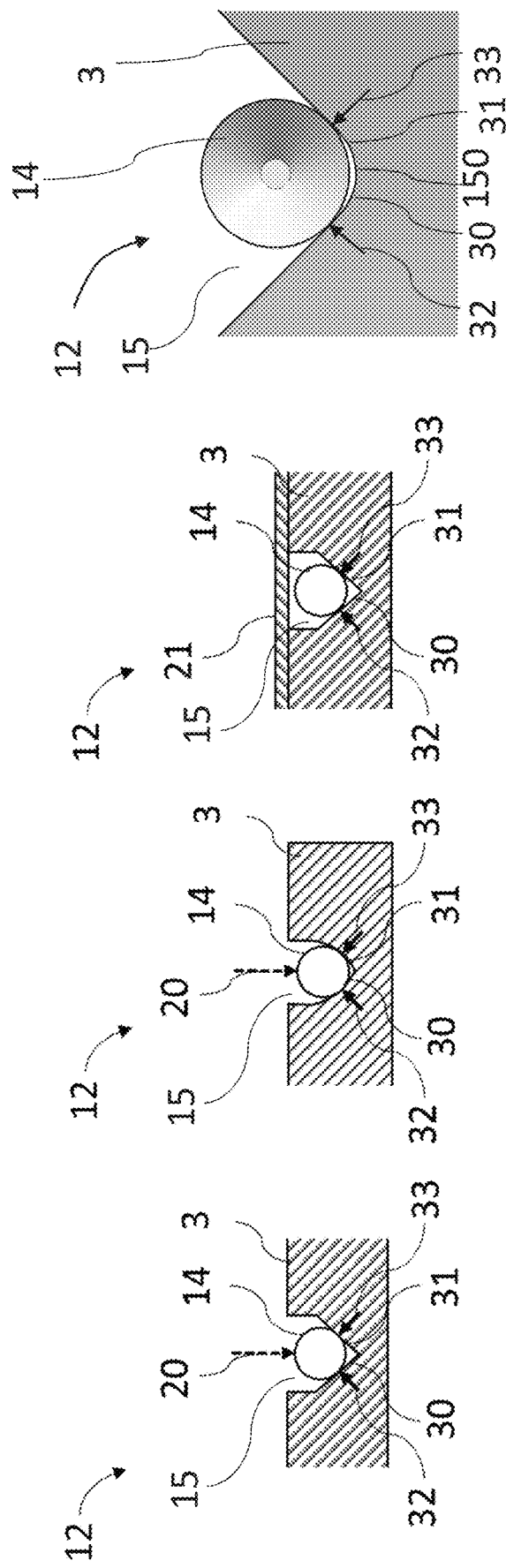
FIG. 4 shows four different embodiments of a pin that is arranged in a notch in views a), b), c), and d)

View a) of FIG. 4 shows a first possible embodiment of the second notch 15, in which the second pin 14 is arranged. The notch 15 has a bottom against which the pin 14 is pressed by means of the radial preload force 20. Alternatively, in accordance with the explanations for FIG. 3, this can be the radial component of a preload force that acts obliquely with respect to the longitudinal axis of the second pin 14.

According to view a) of FIG. 4, the bottom of the second notch 15 has two support surfaces 30, 31 which enclose an angle that is open towards the second pin 14. The angle is selected in such a way that the second pin 14 rests circumferentially on the support surfaces in two different areas and thus causes the constraining forces 32 and 33 on the support surfaces.

Alternatively, the notch can also be designed according to view b) of FIG. 4, wherein the support surfaces 30, 31 are not flat, but have a curvature with a radius that is larger than the radius of the second pin 14.

View c) shows the second pin 14 and the second notch 15 in another sectional plane, which passes through the stroke limiting element 21. As described in FIG. 2, the stroke limiting element 21 serves as a mechanical stop to mechanically limit the radial travel of the second pin 14.

View d) of FIG. 4 shows a further embodiment of the second notch 15 accommodating the second pin 14, wherein here the two support surfaces 30, 31 comprised by the second notch 15 meet at the bottom of the second notch 15 to form a round bottom surface of the second notch 15, particularly at the apex 150 of the bottom surface. Also, here, the second pin 14 is particularly in line contact with the support surfaces 30, 31 of the second notch 15.

Figure 5:
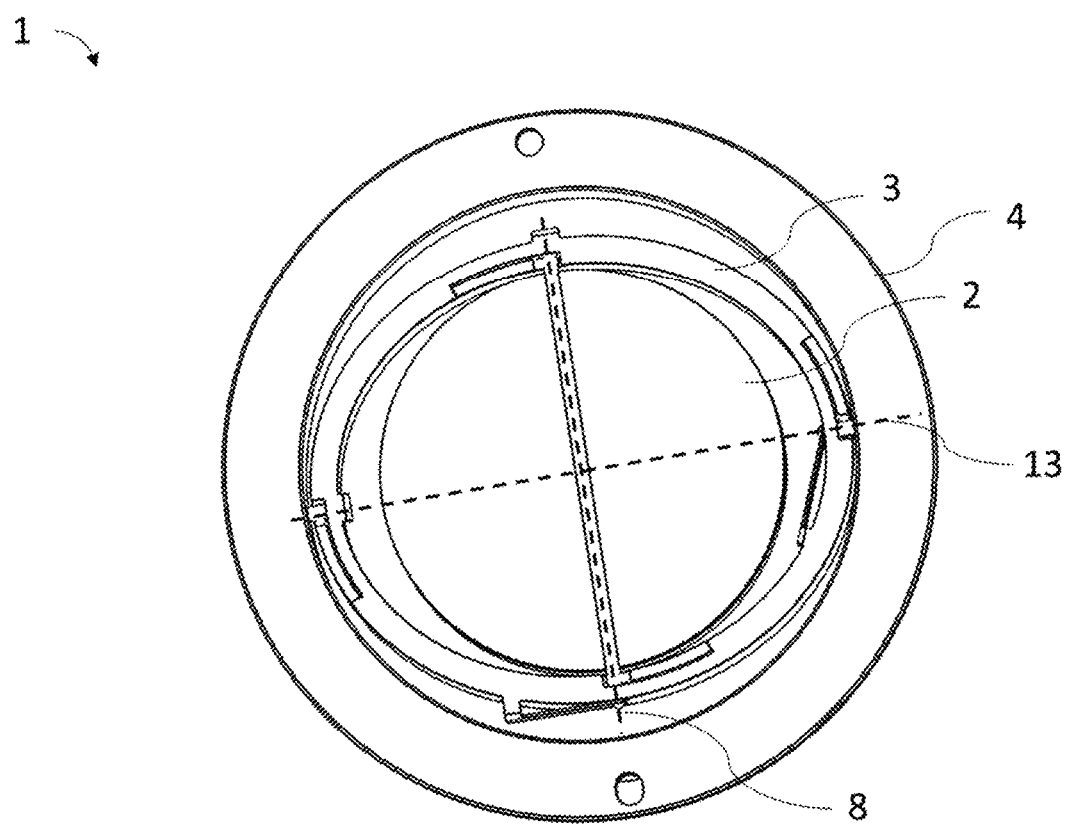
FIG. 5 shows another embodiment of the carrier arrangement according to the invention.

FIG. 5 shows a possible embodiment of the carrier arrangement 1, which can be designed according to the above explanations in relation to FIGS. 1 to 4.

The invention claimed is:

1. Carrier arrangement for an optical device comprising a first carrier and a second carrier, which are rotatable relative to each other about a first axis that is defined by a first bearing means,
wherein the first bearing means is arranged between the first carrier and the second carrier and comprises at least one pin, preferably two pins, with a longitudinal axis,
wherein the pin is arranged such that its longitudinal axis is essentially parallel to the first axis,
wherein a first portion of the pin is attached to the first carrier and a second portion of the pin is moveably arranged in a notch of the second carrier, or wherein the first portion of the pin is attached to the second carrier and the second portion of the pin is moveably arranged in a notch of the first carrier,
the notch comprising at least two support surfaces that are designed such that the second portion of the pin is supported in two circumferential sections by the notch,
the carrier arrangement further comprising a preload element that is designed to exert a preload force on the pin.

2. Carrier arrangement according to claim 1,
wherein the first carrier is at least partially surrounded by the second carrier,
the first bearing means comprises two pins that each are arranged between the first carrier and the second carrier on opposite sides of the first carrier, wherein
each of the pins comprises the first portion that it attached to the first carrier or the second carrier, and wherein each of the pins comprises the second portion, which is arranged in a notch of the respective other second carrier or first carrier.

3. Carrier arrangement according to claim 1,
comprising a third carrier, which at least partially surrounds the second carrier and the first carrier,
which third carrier is rotatable relative to the first carrier and/or the second carrier about a second axis, which extends obliquely to the first axis and which is defined by a second bearing means that is arranged between the second carrier and the third carrier,
wherein the pin is a first pin and the notch is a first notch, and
wherein the second bearing means comprises at least a second pin,
wherein a first portion of the second pin is attached to the third carrier and a second portion of the second pin is moveably arranged in a second notch of the second carrier, or a first portion of the second pin is attached to the second carrier and a second portion of the second pin is moveably arranged in a second notch of the third carrier.

4. Carrier arrangement according to claim 1,
wherein at least one of the support surfaces of the notch, in particular the first notch or the second notch, is flat or rounded with a groove radius, which is larger than a pin radius in the second portion of the pin, in particular the first pin or the second pin, preferably two times larger than the pin radius in the second portion of the pin.

5. Carrier arrangement according to claim 1, wherein the support surfaces are adjacent to a common edge of the notch, in particular the first notch or the second notch, and preferably enclose an opening angle between 60° to 90°.

6. Carrier arrangement according to claim 1, wherein the notch, particularly the first or the second notch, comprises a round bottom, particularly at an apex of the bottom.

7. Carrier arrangement according to claim 1, wherein the preload element is configured to exert a radial preload force on the pin, in particular the first pin or the second pin, with respect to its longitudinal axis and wherein the radial preload force is at least larger than two times, preferably larger than three to ten times, the weight of the carrier, which is attached to the first portion of the pin.

8. Carrier arrangement according to claim 1, wherein the preload element is designed to exert an axial preload force on the pin, in particular the first pin or the second pin, with respect to its longitudinal axis.

9. Carrier arrangement according to claim 1, wherein the preload element comprises a spring element, that is inclined by 30° to 60° with respect to the first axis, or preferably the second axis, and which is designed to both exert the radial preload force and the axial preload force to the pin, in particular the first pin or the second pin.

10. Carrier arrangement according to claim 1, wherein the preload element comprises a pre-loaded elastic element, preferably a leaf spring, which is designed as an integral part of the carrier that comprises the notch, in particular the first notch or the second notch.

11. Carrier arrangement according to claim 1, wherein the pin, in particular the first pin or the second pin, is made of a magnetic material and the preload element comprises at least one magnet that exerts the radial preload force and/or the axial preload force on the pin by means of a field force.

12. Carrier arrangement according to claim 1, comprising a stroke limiting element that delimits a radial and/or an axial travel of the pin, in particular the first pin or the second pin, relative to the support surfaces of the notch, in particular the first notch or the second notch.

13. Carrier arrangement according to claim 12, wherein the stroke limiting element is designed to support a radial force up to 20 times, preferably up to 100 times the weight of the carrier, that is attached to the first portion of the pin, in particular the first pin or the second pin.

14. Carrier arrangement according to claim 12, wherein the stroke limiting element is designed such that a radial pin travel is limited to 0.2 mm, preferably smaller than 0.1 mm relative to the support surfaces of the notch, in particular the first notch or the second notch.

15. Carrier arrangement according to claim 1, wherein the stroke limiting element and the preload element are designed as a monolithic single piece that is attached to one of the carriers that comprises the notch, in particular the first notch or the second notch.

16. Carrier arrangement according to claim 1, wherein at least one optical device, preferably a mirror and/or a diffuser is attached to the first carrier.

17. Carrier arrangement according to claim 1, with at least a first actuator, which is arranged such that a tilt-torque and/or a tilt-force is applicable to the first carrier and/or the second carrier in order to cause a first relative tilt between the first carrier and the second carrier about the first axis, preferably wherein the first actuator is a first magnetic actuator, comprising at least one magnet and at least one coil, wherein the magnet is attached to the first carrier and the coil is attached to the second carrier or vice versa.

18. Carrier arrangement according to claim 3, with at least a second actuator, which is arranged such that a tilt-torque and/or a tilt-force is applicable to the third carrier and/or the second carrier in order to cause a second relative tilt between the second carrier and the third carrier about the second axis, preferably wherein the second actuator is a second magnetic actuator, comprising at least one magnet and at least one coil, wherein the magnet is attached to the second carrier and the coil is attached to the third carrier or vice versa.

19. Carrier arrangement according to claim 1, with at least one tilt-sensor which is arranged such that a first relative tilt-angle is determinable between the first carrier and the second carrier about the first axis and/or preferably a second relative tilt-angle between the second carrier and the third carrier about the second axis.

* * * * *